(12) United States Patent
Nevins

(10) Patent No.: US 8,662,136 B2
(45) Date of Patent: Mar. 4, 2014

(54) ANTI-STRANGULATION APPARATUS FOR, AND HANGING FREELY WITH, A LOOPED CORD OF A WINDOW COVERING DEVICE

(75) Inventor: Robert L. Nevins, Boiceville, NY (US)

(73) Assignee: Robert L Nevins, Sr., Boicville, NY (US)

( * ) Notice: Subject to any disclaimer, the term of this patent is extended or adjusted under 35 U.S.C. 154(b) by 371 days.

(21) Appl. No.: 12/803,709

(22) Filed: Jul. 1, 2010

(65) Prior Publication Data

US 2011/0185540 A1 Aug. 4, 2011

Related U.S. Application Data

(60) Provisional application No. 61/337,115, filed on Feb. 1, 2010.

(51) Int. Cl.
*E06B 9/30* (2006.01)

(52) U.S. Cl.
USPC .............................. 160/178.1 R; 160/173 R

(58) Field of Classification Search
USPC ............. 160/168.1 R, 168.1 V, 173 R, 173 V, 160/178.1 R, 178.1 V, 84.04
See application file for complete search history.

(56) References Cited

U.S. PATENT DOCUMENTS

| 3,022,819 | A | * | 2/1962 | Lampret | 160/345 |
|---|---|---|---|---|---|
| 4,336,834 | A | * | 6/1982 | Schaller | 160/168.1 R |
| 5,143,136 | A | * | 9/1992 | John | 160/173 R |
| 5,553,653 | A | * | 9/1996 | Rozon | 160/173 R |
| 5,595,232 | A | * | 1/1997 | Benthin | 160/178.1 R |
| 5,671,793 | A | * | 9/1997 | Lee | 160/168.1 R |
| 5,752,558 | A | * | 5/1998 | Lin | 160/320 |
| 5,797,441 | A | * | 8/1998 | Benthin | 160/173 V |
| 5,845,696 | A | * | 12/1998 | Chou | 160/178.1 V |
| 5,853,039 | A | * | 12/1998 | Fraser et al. | 160/176.1 V |
| 6,189,595 | B1 | * | 2/2001 | Lee | 160/168.1 R |
| 6,196,293 | B1 | * | 3/2001 | Lee | 160/168.1 V |
| 6,463,987 | B1 | * | 10/2002 | Nevins | 160/178.1 R |
| 6,516,860 | B1 | * | 2/2003 | Weaver et al. | 160/168.1 R |
| 6,644,374 | B2 | * | 11/2003 | Nien | 160/168.1 R |
| 6,792,999 | B2 | * | 9/2004 | Cross et al. | 160/321 |
| 7,114,544 | B2 | * | 10/2006 | Rice et al. | 160/178.1 V |
| 7,793,700 | B2 | * | 9/2010 | Bossler | 160/173 R |
| 7,931,069 | B2 | * | 4/2011 | Cannaverde et al. | 160/173 R |
| 8,286,686 | B2 | * | 10/2012 | Cannaverde | 160/320 |
| 2003/0111188 | A1 | * | 6/2003 | Cross et al. | 160/84.01 |
| 2007/0056693 | A1 | * | 3/2007 | Szebeni | 160/168.1 V |
| 2009/0205788 | A1 | * | 8/2009 | Cannaverde et al. | 160/168.1 R |
| 2011/0094065 | A1 | * | 4/2011 | Frederick | 24/115 F |
| 2012/0090795 | A1 | * | 4/2012 | Kirby | 160/307 |

* cited by examiner

*Primary Examiner* — Blair M. Johnson
(74) *Attorney, Agent, or Firm* — Charles Baxley

(57) ABSTRACT

An anti-strangulation apparatus for, and hanging freely with, a looped cord of a window covering device. The apparatus includes a tube. The tube at first has the looped cord of the window covering device enter therein, then has the looped cord of the window covering device exit therefrom and run therealong, and then has the looped cord of the window covering device reenter therein again where the looped cord of the window covering device is reeved, and in so doing, the anti-strangulation device is allowed to hang freely with the looped cord of the window covering device and keep the looped cord of the window covering device snug enough against the tube to prevent strangulation by the looped cord of the window covering device, while allowing the looped cord of the window covering device to remain fully operational.

13 Claims, 3 Drawing Sheets

ANTI-STRANGULATION APPARATUS FOR, AND HANGING FREELY WITH, A LOOPED CORD OF A WINDOW COVERING DEVICE

1. CROSS REFERENCE TO RELATED APPLICATIONS

The instant non-provisional patent application claims priority from provisional patent application No. 61/337,115, filed on Feb. 1, 2010, entitled CORD-SAFE-WAND, and incorporated herein by reference thereto.

2. BACKGROUND OF THE INVENTION

A. Field of the Invention

The embodiments of the present invention relate to an anti-strangulation apparatus for a looped cord of a window covering device, and more particularly, the embodiments of the present invention relate to an anti-strangulation apparatus for, and hanging freely with, a looped cord of a window covering device.

B. Description of the Prior Art

Cords for controlling window covering devices, for example blinds or curtains, have been implicated in many deaths, particularly those of infants and small children. Many window covering devices manufactured prior to 1995 utilized a looped control cord to raise, lower, and otherwise control the window covering devices.

Subsequently, many window covering devices have been manufactured utilizing two separate control cords to control different aspects of the window coverings, for example, the raising and/or lowering thereof. These systems include a tassel on an end of each cord to reduce the likelihood of the control cords becoming entangled and forming a noose in which children might become entangled.

Despite this modification, many deaths have resulted from children becoming entangled, and hanging themselves, in window covering control cords of both the looped variety and the double corded tassel variety. Children also have hanged themselves in other cords of these window covering devices that hold the slats or vanes thereof, and which are connected to the window covering control cords.

Therefore, there is a need for an anti-strangulation apparatus for, and hanging freely with, a cord of a window covering device.

Numerous innovations for anti-strangulation devices for a cord of a window treatment have been provided in the prior art. Even though these innovations may be suitable for the individual purposes to which they address, nevertheless, they differ from the present invention in that they do not teach an anti-strangulation apparatus for, and hanging freely with, a looped cord of a window covering device. For example:

(1) U.S. Pat. No. 6,463,987 B1 to Nevins.

U.S. Pat. No. 6,463,987 B1 issued to Nevins on Oct. 15, 2002 in U.S. class 160 and subclass 178.1 R teaches a system for controlling a window covering device, which includes a body adapted for mounting adjacent to a wall, and a weight. The body includes a channel and an entry aperture. The entry aperture is adapted for entry of at least one cord of the window covering device into the channel, and the weight is adapted for movable attachment to the at least one cord.

Even though these innovations may be suitable for the specific individual purposes to which they address, however, they would not be suitable for the purposes of the present invention as heretofore described, namely, an anti-strangulation apparatus for, and hanging freely with, a looped cord of a window covering device.

3. SUMMARY OF THE INVENTION

Thus, an object of the embodiments of the present invention is to provide an anti-strangulation apparatus for, and hanging freely with, a looped cord of a window covering device, which avoids the disadvantages of the prior art.

Briefly stated, another object of the embodiments of the present invention is to provide an anti-strangulation apparatus for, and hanging freely with, a looped cord of a window covering device. The apparatus includes a tube. The tube at first has the looped cord of the window covering device enter therein, then has the looped cord of the window covering device exit therefrom and run therealong, and then has the looped cord of the window covering device reenter therein again where the looped cord of the window covering device is reeved, and in so doing, the anti-strangulation device is allowed to hang freely with the looped cord of the window covering device and keep the looped cord of the window covering device snug enough against the tube to prevent strangulation by the looped cord of the window covering device, while allowing the looped cord of the window covering device to remain fully operational.

The novel features considered characteristic of the embodiments of the present invention are set forth in the appended claims. The embodiments of the present invention themselves, however, both as to their construction and their method of operation together with additional objects and advantages thereof will be best understood from the following description of the specific embodiments when read and understood in connection with the accompanying figures of the drawing.

4. BRIEF DESCRIPTION OF THE FIGURES OF THE DRAWING

The figures of the drawing are briefly described as follows.

5. LIST OF REFERENCE NUMERALS UTILIZED IN THE DRAWING

Figure 1:
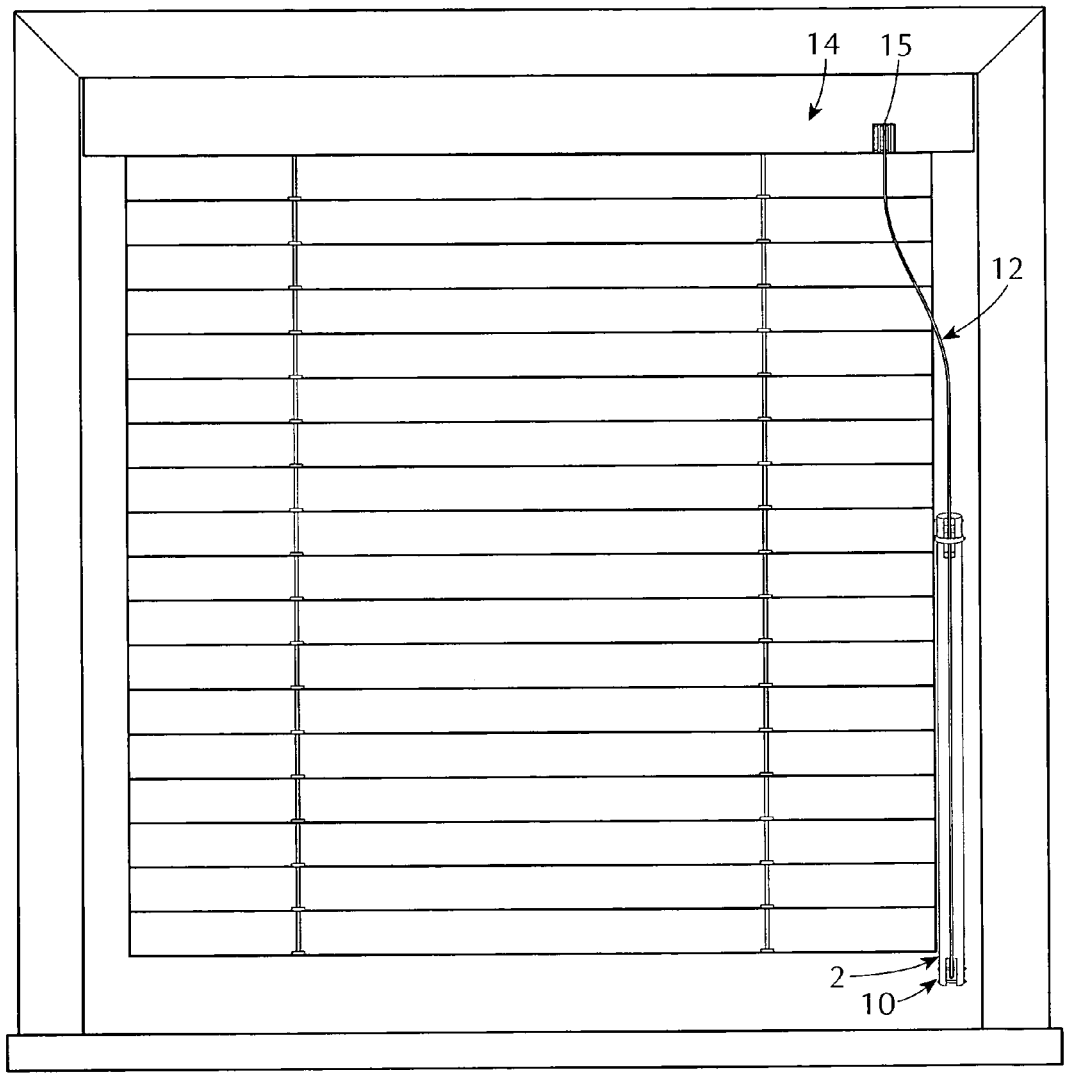
FIG. 1 is a diagrammatic front elevational view of the anti-strangulation apparatus of the embodiments of the present invention for, and hanging freely with, a looped cord of a window covering device.

A. General.

10 anti-strangulation apparatus of embodiments of present invention for, and hanging freely with, looped cord 12 of window covering device 14

12 looped cord of window covering device 14

14 window covering device 15 shade roller of window covering device 14

B. Overall Configuration of Anti-Strangulation Apparatus 10.

16 tube

C. Specific Configuration of Tube 16.

18 entrance through slot of tube 16

20 exit through slot 20 of tube 16

22 uppermost end of tube 16

24 lowermost end of tube 16
25 plug
26 pulley
27 pivot pin rivet of pulley 26
28 band
29 upper rivet of band 28
30 upper aperture of tube 16
31 upper rivet of plug 25
32 lower rivet
34 lower aperture of tube 16
36 forward-facing portion of looped chain 12
38 rearward-facing portion of looped chain 12

6. DETAILED DESCRIPTION OF THE PREFERRED EMBODIMENTS

A. General.

Referring now to the figures, in which like numerals indicate like parts, and particularly to FIG. 1, which is a diagrammatic front elevational view of the anti-strangulation apparatus of the embodiments of the present invention for, and hanging freely with, a looped cord of a window covering device, the anti-strangulation apparatus of the embodiments of the present invention is shown generally at 10 for, and hanging freely with, a looped cord 12 of a window covering device 14. The window covering device 14 has a shade roller 15.

B. The Overall Configuration of the Anti-Strangulation Apparatus 10.

Figure 2:
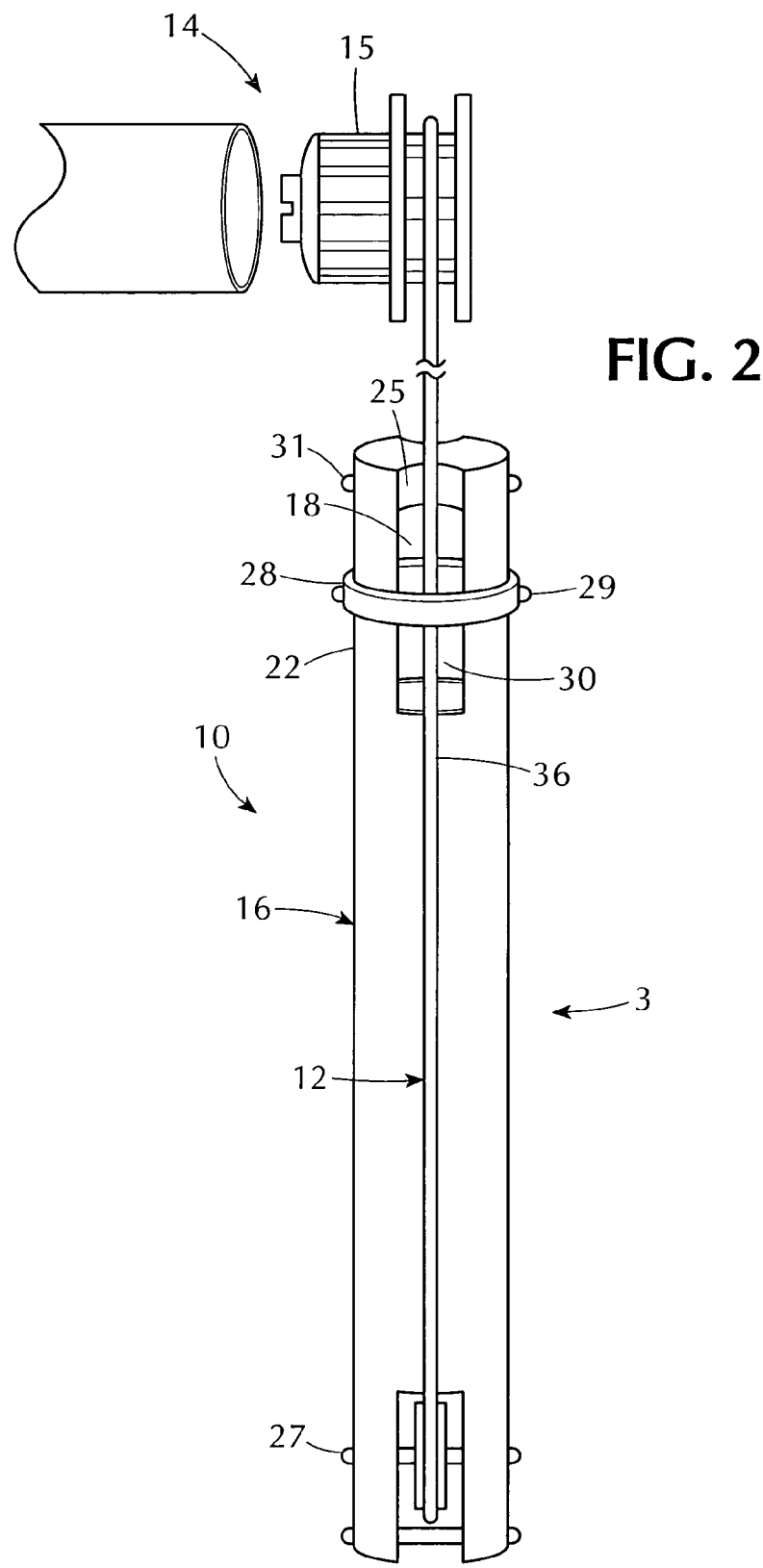
FIG. 2 is an enlarged diagrammatic perspective view of the anti-strangulation apparatus of the embodiments of the present invention identified by ARROW 2 in FIG. 1.
Figure 3:
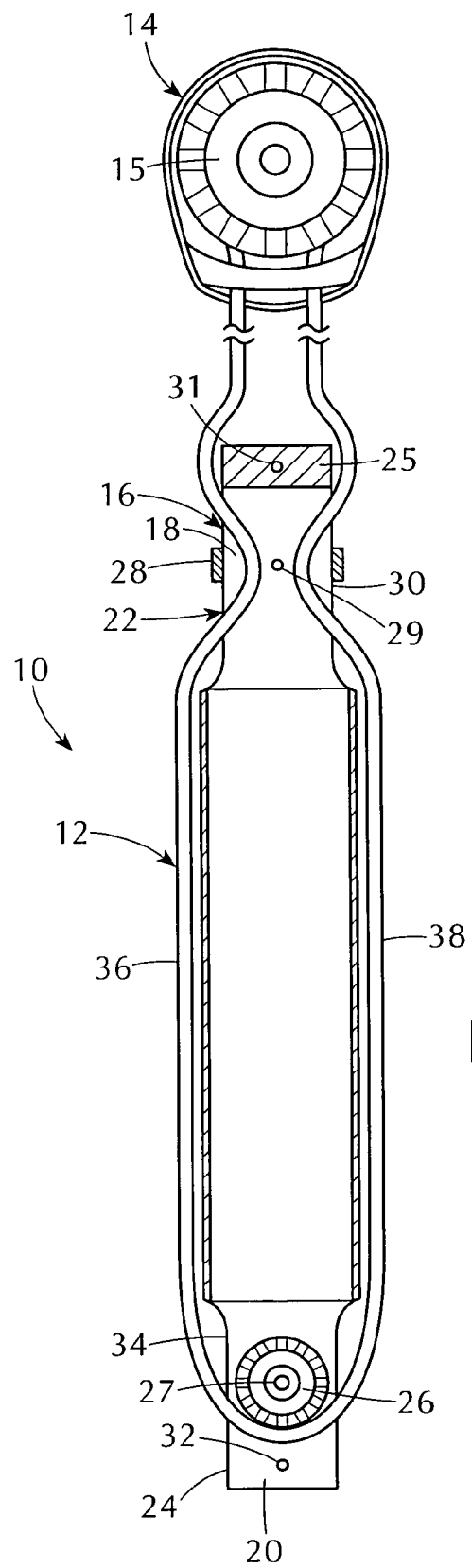
FIG. 3 is a diagrammatic side elevational view, in partial section, taken generally in the direction of ARROW 3 in FIG. 2.

The overall configuration of the anti-strangulation apparatus 10 can best be seen in FIGS. 2 and 3, which are, respectively, an enlarged diagrammatic perspective view of the anti-strangulation apparatus of the embodiments of the present invention identified by ARROW 2 in FIG. 1, and a diagrammatic side elevational view, in partial section, taken generally in the direction of ARROW 3 in FIG. 2, and as such, will be discussed with reference thereto.

The anti-strangulation apparatus 10 comprises a tube 16. The tube 16 at first has the looped cord 12 of the window covering device 14 enter therein, then has the looped cord 12 of the window covering device 14 exit therefrom and run therealong, and then has the looped cord 12 of the window covering device 14 reenter therein again where the looped cord 12 of the window covering device 14 is reeved, and in so doing, the anti-strangulation apparatus 10 is allowed to hang freely with the looped cord 12 of the window covering device 14 and keep the looped cord 12 of the window covering device 14 snug enough against the tube 16 to prevent strangulation by the looped cord 12 of the window covering device 14, while allowing the looped cord 12 of the window covering device 14 to remain fully operational.

C. The Specific Configuration of the Tube 16.

The tube 16 has an entrance through slot 18 and an exit through slot 20. The entrance through slot 18 of the tube 16 allows the looped cord 12 of the window covering device 14 to exit from the tube 16, while the exit through slot 20 of the tube 16 allows the looped cord 12 of the window covering device 14 to reenter the tube 16.

The tube 16 has an uppermost end 22 and a lowermost end 24. The entrance through slot 18 of the tube 16 is disposed at the uppermost end 22 of the tube 16 and the exit through slot 20 of the tube 16 is disposed at the lowermost end 24 of the tube 16 so as to allow the anti-strangulation apparatus 10 to hang freely vertically with the looped cord 12 of the window covering device 14.

The entrance through slot 18 of the tube 16 runs axially and the exit through slot 20 of the tube 16 runs axially, and in line with, the entrance through slot 18 of the tube 16 so as to allow the looped cord 12 of the window covering device 14 to remain fully operational as it runs along the tube 16.

The anti-strangulation device 10 further comprises a pulley 26. The pulley 26 is rotatably disposed in the lowermost end 24 of the tube 16 via a pivot pin rivet 27.

The tube 16 at first has the looped cord 12 of the window covering device 14 enter therein, then has the looped cord 12 of the window covering device 14 exit therefrom via the entrance through slot 18 of the tube 16 and run therealong, and then has the looped cord 12 of the window covering device 14 reenter therein again via the exit through slot 20 of the tube 16 where the looped cord 12 of the window covering device 14 is reeved via the pulley 26, and in so doing, the anti-strangulation apparatus 10 is allowed to hang freely with the looped cord 12 of the window covering device 14 and keep the looped cord 12 of the window covering device 14 snug enough against the tube 16 to prevent strangulation by the looped cord 12 of the window covering device 14, while allowing the looped cord 12 of the window covering device 14 to remain fully operational.

The ant-strangulation device 10 further comprises a plug 25. The plug 25 closes the uppermost end 22 of the tube 16, is maintained therein by an upper rivet 31 passing through the uppermost end 22 of the tube 16 and the plug 25, and provides an upper boundary for the entrance through slot 18 of the tube 16.

The ant-strangulation device 10 further comprises a band 28. The band 28 is wrapped around the uppermost end 22 of the tube 16, over a portion of the entrance through slot 18 of the tube 16, and is maintained therearound by an upper rivet 29 passing therethrough and through the uppermost end 22 of the tube 16, so as to form an upper aperture 30 of the tube 16 through which the looped cord 12 of the window covering device 14 exits from the tube 16 after the looped cord 12 of the window covering device 14 has initially entered the tube 16.

The anti-strangulation device 10 further comprises a lower rivet 32. The lower rivet 32 extends through the lowermost end 24 of the tube 16, over a portion of the exit through slot 20 of the tube 16, so as to form a lower aperture 34 of the tube 16 through which the looped cord 12 of the window covering device 14 reenters into the tube 16 after the looped cord 12 of the window covering device 14 has exited the tube 16.

It is to be understood that the looped chain 12 can have a forward-facing portion 36 of one color, a rearward-facing portion 38 of another color, and both the forward-facing portion 36 of the looped chain 12 and the rearward-facing portion 38 of the looped chain 12 are pullable only in the down direction, so that when the forward-facing portion 36 of the looped chain 12 is pulled down, the shade roller 15 of the window covering device 14 will go in one direction, and when the rearward-facing portion 38 of the looped chain 12 is pulled down, the shade roller 15 of the window covering device 14 will go in an opposite direction.

D. Impressions.

It will be understood that each of the elements described above or two or more together may also find a useful application in other types of constructions differing from the types described above.

While the embodiments of the present invention have been illustrated and described as embodied in an anti-strangulation apparatus for, and hanging freely with, a looped cord of a window covering device, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis the foregoing will so fully reveal the gist of the present invention that others can by applying current knowledge readily adapt them for various applications without omitting features that from the standpoint of prior art fairly constitute characteristics of the generic or specific aspects of the embodiments of the present invention.

The invention claimed is:

1. An anti-strangulation apparatus for, and hanging freely with, a looped cord of a window covering device, comprising:
 a) a tube;
 wherein said tube has an outer surface; and
 wherein said tube at first has the looped cord of the window covering device enter in said tube, then has the looped cord of the window covering device exit from said tube and run along said outer surface of said tube, and then has the looped cord of the window covering device reenter in said tube again where the looped cord of the window covering device is reeved, and in so doing, said anti-strangulation device is allowed to hang freely with the looped cord of the window covering device and keep the looped cord of the window covering device snug enough against said tube to prevent strangulation by the looped cord of the window covering device, while allowing the looped cord of the window covering device to remain fully operational.

2. The apparatus of claim 1, wherein said tube has an entrance through slot;
 wherein said tube has an exit through slot;
 wherein said entrance through slot of said tube allows the looped cord of the window covering device to exit from said tube; and
 wherein said exit through slot of said tube allows the looped cord of the window covering device to reenter said tube.

3. The apparatus of claim 2, wherein said tube has an uppermost end;
 wherein said tube has a lowermost end; and
 wherein said entrance through slot of said tube is disposed at said uppermost end of said tube and said exit through slot of said tube is disposed at said lowermost end of said tube so as to allow said anti-strangulation apparatus to hang freely vertically with the looped cord of the window covering device.

4. The apparatus of claim 2, wherein said entrance through slot of said tube runs axially and said exit through slot of said tube runs axially, and in line with, said entrance through slot of said tube so as to allow the looped cord of the window covering device to remain operational as the looped cord of the window covering device runs along said tube.

5. The apparatus of claim 3, further comprising a pulley.

6. The apparatus of claim 5, wherein said pulley is rotatably disposed in said lowermost end of said tube.

7. The apparatus of claim 5, wherein said tube at first has the looped cord of the window covering device enter therein via said entrance through slot of said tube, then has the looped cord of the window covering device exit therefrom and run therealong, and then has the looped cord of the window covering device reenter therein again via said exit through slot of said tube where the looped cord of the window covering device is reeved via said pulley, and in so doing, said anti-strangulation apparatus is allowed to hang freely with the looped cord of the window covering device and keep the looped cord of the window covering device snug enough against said tube to prevent strangulation by the looped cord of the window covering device, while allowing the looped cord of the window covering device to remain fully operational.

8. The apparatus of claim 3, further comprising a band.

9. The apparatus of claim 8, wherein said band is wrapped around said uppermost end of said tube, over a portion of said entrance through slot of said tube, and is maintained therearound by an upper rivet passing therethrough and through said uppermost end of said tube, so as to form an upper aperture of said tube through which the looped cord of the window covering device exits from said tube after the looped cord of the window covering device has initially entered said tube.

10. The apparatus of claim 3, further comprising a lower rivet.

11. The apparatus of claim 10, wherein said lower rivet extends through said lowermost end of said tube, over a portion of said exit through slot of said tube, so as to form a lower aperture of said tube through which the looped cord of the window covering device reenters into after the looped cord of the window covering device has exited said tube.

12. The apparatus of claim 3, further comprising a plug; and
 wherein said plug closes said uppermost end of said tube, is maintained therein by an upper rivet passing through said uppermost end of said tube and said plug, and provides an upper boundary for said entrance through slot of said tube.

13. The apparatus of claim 1, wherein the looped cord has a forward-facing portion of one color;
 wherein the looped cord has a rearward-facing portion of another color; and
 wherein both the forward-facing portion of the looped cord and the rearward-facing portion of the looped cord are pullable only in the down direction, so that when the forward-facing portion of the looped cord is pulled down, the shade roller of the window covering device will go in one direction, and when the rearward-facing portion of the looped cord is pulled down, the shade roller of the window covering device will go in an opposite direction.

* * * * *